United States Patent [19]
Kono

[11] Patent Number: 4,549,618
[45] Date of Patent: Oct. 29, 1985

[54] COMBINATORIAL WEIGHING METHOD AND APPARATUS

[75] Inventor: Katsuaki Kono, Ohtsu, Japan

[73] Assignee: Kabushiki Kaisha Ishida Koki Seisakusho, Kyoto, Japan

[21] Appl. No.: 515,517

[22] Filed: Jul. 20, 1983

[30] Foreign Application Priority Data

Jul. 26, 1982 [JP] Japan ................. 57-131018

[51] Int. Cl.[4] ............. G01G 19/22; G01G 19/52
[52] U.S. Cl. ................................ 177/25; 177/1; 177/50
[58] Field of Search .................... 177/1, 25, 50

[56] References Cited

U.S. PATENT DOCUMENTS 4,385,671  5/1983  Hirano .................... 177/25
4,396,078  8/1983  Minamida et al. ........ 177/25 X
4,416,341 11/1983  Hirano .................... 177/25
4,446,937  5/1984  Asai ....................... 177/1
4,484,645 11/1984  Inoue ..................... 177/25

Primary Examiner—George H. Miller, Jr.
Attorney, Agent, or Firm—Staas & Halsey

[57] ABSTRACT

A combinatorial weighing method and apparatus for supplying a plurality of weighing machines with articles to be weighed, obtaining a plurality of combinations of the weighing machines, each weighing machine combination giving a combination of articles having a combined weight value equal or closest to a target weight value, and selecting an optimum combination from these plural combinations. The optimum combination is one which provides a combination of articles having a combined weight value having a minimum error with respect to the target weight value and which is within preset allowable limits. The statistical dispersion of the weight values from the weighing machines which do not participate in the combination has a value that is equal to or greater than a predetermined tolerance. When an optimum combination is obtained, the articles are discharged from the weighing machines corresponding thereto.

7 Claims, 2 Drawing Figures

COMBINATORIAL WEIGHING METHOD AND APPARATUS

BACKGROUND OF THE INVENTION

This invention relates to a combinatorial weighing method and apparatus wherein a plurality of weighing machines are supplied with articles, items of weight data from the weighing machines are combined, weighing machines are selected to give a combination of weight data within preset allowable limits and satisfying a predetermined condition, and the articles are discharged from the selected weighing machines.

The combinatorial weighing method includes steps of forming combinations of the weight data obtained from the plural weighing machines, taking the sum of each combination to give a combined weight value, and obtaining the combination of weighing machines which gives a combined weight value that is within preset allowable limits and equal or closest to a target value. In general, with such an arrangement, the larger the number of combinations, the greater the accuracy that can be obtained. When a number of weighing machines produce outputs of identical weight data there is a decrease in the number of combinations within the preset allowable limits and, hence, a decline in measurement accuracy. At times, the only combinations that can be obtained are those that give a combined weight value outside of the allowable limits. Such a weight value will hereafter be referred to as an "unsatisfactory" combined weight value.

It is obvious that the occurrence of unsatisfactory combined weight values is an undesirable phenomenon in a combinatorial weighing system. Conventionally, the occurrence of unsatisfactory weight values has been prevented by not discharging the articles from the weighing machines when not a single combined weight value from all combinations of the weight data falls within the allowable limits. Then, some of the weighing machines are supplied with additional articles and a combinatorial weighing is again performed to obtain new combined weight values from the combinations that will be obtained.

With the foregoing method, however, the efficiency of the processing performed by the combinatorial weighing apparatus declines in proportion to the number of weighing cycles in which articles are not discharged. In addition, the fact that some weighing machines are supplied with additional articles following a non-discharge cycle frequently results in an "overscale" phenomenon, in which an excess of the articles is delivered.

SUMMARY OF THE INVENTION

Accordingly, an object of the present invention is to provide a combinatorial weighing method and apparatus capable of precluding the occurrence of unsatisfactory weight values.

Another object of the present invention is to provide a combinatorial weighing method and apparatus in which the processing efficiency of the apparatus can be improved, and in which weight values that are too large, caused by supplying additional articles, can be prevented.

According to the present invention, the foregoing objects are attained by providing a combinatorial weighing method and apparatus for supplying a plurality of weighing machines with articles to be weighed, obtaining a plurality of combinations of the weighing machines, each weighing machine combination giving a combination of articles having a combined weight value equal or closest to a target weight value, and selecting an optimum combination from these plural combinations. The optimum combination is one which gives a combination of articles having a combined weight value whereof has a minimum error with respect to the target weight value and being within preset allowable limits. The statistical dispersion of weight values from the weighing machines which do not participate in the combination has a value that is equal to or greater than a predetermined tolerance. When such a combination is obtained, the articles are discharged from the weighing machines corresponding thereto.

Other features and advantages of the present invention will be apparent from the following description taken in conjunction with the accompanying drawings.

DESCRIPTION OF THE PREFERRED EMBODIMENT

Figure 1:
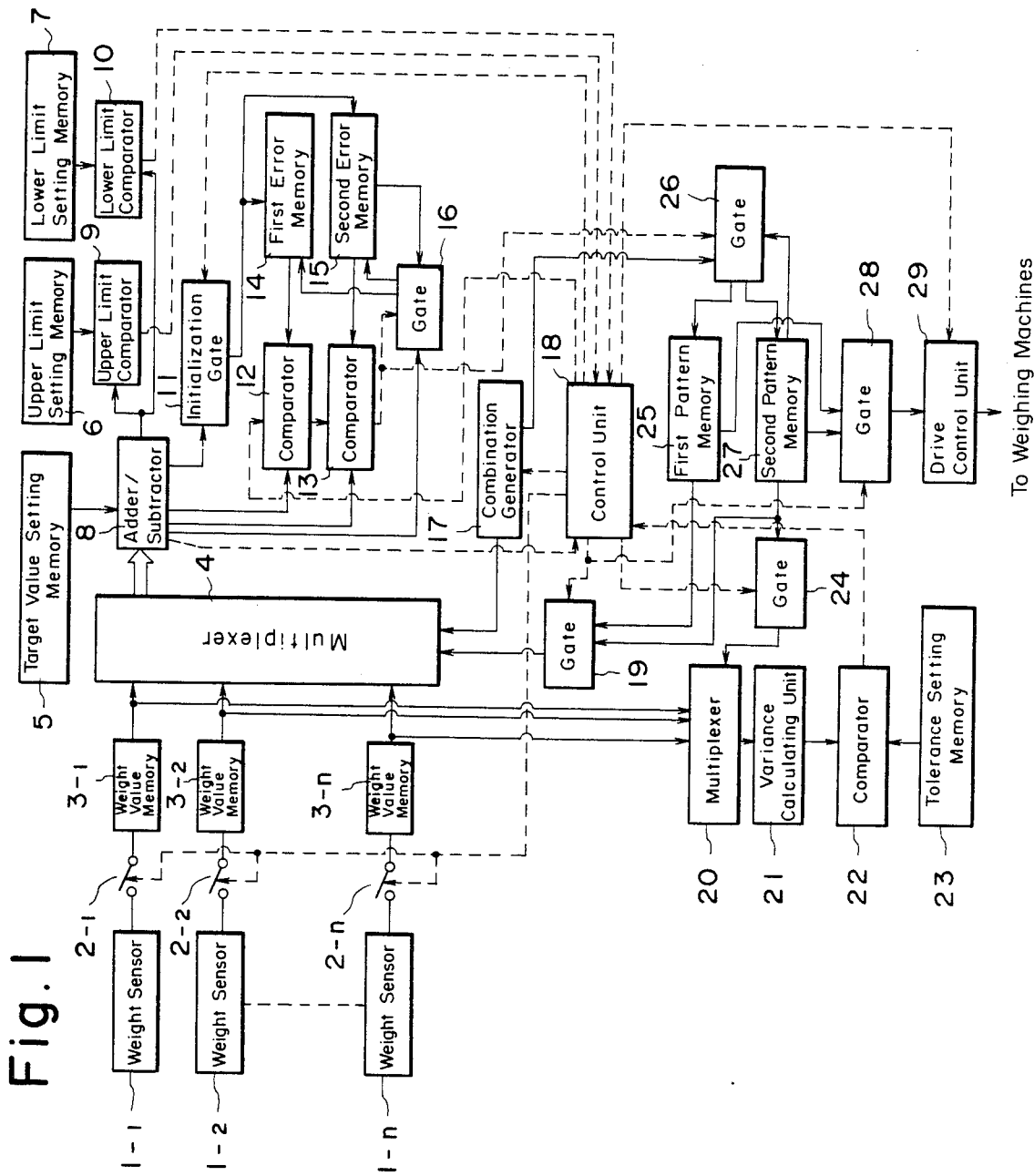
FIG. 1 is a block diagram of a preferred embodiment of a combinatorial weighing apparatus for practicing a combinatorial weighing method according to the present invention.

Reference will now be had to the drawings for a detailed description of the invention. We will assume that the combinatorial weighing apparatus has n-number of weighing machines, that the criterion for selection of a weight combination is a minimum deviation (specifically, the absolute value of the minimum deviation) from a target value, the deviation will be referred to as an "error", and the dispersion exhibited by remaining weighing data is judged on the basis of a variance value, as will be described later in greater detail.

The n-number of weighing machines comprise respective weight sensors 1-1 through 1-n and weighing hoppers, not shown. Each of the weight sensors is adapted to produce a signal indicative of the weight of the articles contained in the respective weighing hopper, which is connected thereto. The weight sensors 1-1 through 1-n have their outputs connected to respective gates 2-1 through 2-n which are enabled by a signal from a control unit 18, thereby delivering the weight sensor outputs to respective weight value memories 3-1 through 3-n. A multiplexer 4 receives the weight data, namely the weight values, stored in the weight value memories and successively delivers to an adder/subtractor 8 those weight values that are designated by a signal from a combination generator 17. The signal produced by the combination generator 17 corresponds to a combination of the weighing machines, which are n in number as mentioned above. Therefore, the aforesaid signal is an n-bit signal of which there are $2^n-1$ varieties, indicative of $2^n-1$ combinations, ranging from a signal in which only the first bit is logical "1", to a signal in which all bits are at logical "1". Assume that the signal produced by the combination generator 17 and applied to the multiplexer 4 is a signal in which only the first and third bits are logical "1", with all other bits being logical "0". In such case the multiplexer 4 will provide the adder/subtractor 8 with the weight data from the weight value memories 3-1, 3-n. The combination generator 17 comprises an n-bit binary counter incremented by a signal from the control unit 18.

A target weight value setting memory 5 sets and stores a target weight value, and delivers the target weight value to the adder/subtractor 8 as an output signal. The adder/subtractor 8 adds the combination of weight values obtained from the multiplexer 4, the combination corresponding to a combination of the weighing machines, subtracts the target weight value from the sum of the weight values, (that is, from the combined weight value) and applies the result to an upper limit comparator 9 and lower limit comparator 10. An upper limit setting memory 6 and a lower limit setting memory 7 set and store upper and lower limit values, respectively, which define the allowable limits of an error, or deviation, between the target weight value and a combined weight value. These upper and lower limit values are applied to the upper limit comparator 9 and lower limit comparator 10, respectively. The upper and lower limit comparators 9 and 10 compare the result of the arithmetic operation performed by the adder/subtractor 8 with the upper and lower limit values from, the upper and lower limit value setting memories 9 and 10, respectively. The results of comparision operations are delivered as output signals to the control unit 18.

An initialization gate 11 is enabled by a signal from the control unit 18 immediately after the start of a combinatorial computation. Accordingly, the gate 11 delivers, to a first error memory 14 and a second error memory 15, the absolute value of the results obtained from the initial arithmetic operation performed by the adder/subtractor 8. The first and second error memories 14 and 15 are adapted to store this absolute value. A comparator 12 compares the contents of the first error memory 14 with the absolute value of the results obtained from the second and subsequent arithmetic operations performed by the adder/subtractor 8. When an absolute value from any of these arithmetic operations is smaller than the value stored in the first error memory 14, the comparator 12 produces a signal that is applied to a comparator 13. The comparator 13 responds to the signal by comparing the absolute value from the adder/subtractor 8 with the value stored in the second error memory 15, and outputs a signal to gates 16 and 26.

The gate 16, in accordance with the signal from the comparator 13, is operable to deliver the absolute value from the adder/subtractor 8, or the value in the second error memory 15, whichever is smaller, to the second error memory 15, and to deliver the other (larger) value to the first error memory 14. The first and second memories 14 and 15 are thus set to the values obtained from the gate 16. When the absolute value output of the adder/subtractor 8 is smaller than the value in the second error memory 15, the gate 26, in accordance with the output of the comparator 13, delivers the output of the combination generator 17 to a second pattern memory 27 to store the output, and delivers the prevailing contents of the second pattern memory 27 to a first pattern memory 25 where the contents are then stored. On the other hand, when the absolute value output of the adder/subtractor 8 is larger than the value in the second error memory 15, the gate 26 leaves the contents of the second pattern memory 27 intact and stores the prevailing output of the combination generator 17 in the first pattern memory 25. A gate 19, in response to a signal from the control unit 18, delivers the contents (bit pattern) of either the first or second pattern memories (25 or 27) to the multiplexer 4. A gate 28, also in response to the signal from the control unit 18, delivers the contents of either the first or second pattern memories (25 or 27) to a drive control unit 29. The drive control unit 29 controls the operation of the weighing machines, which are not shown.

A multiplexer 20 receives the contents (bit pattern) of the second pattern memory 27 through a gate 24, and is adapted to successively provide a variance calculating unit 21 with the weight values in the weight value memories 3-1 through 3-n corresponding to the "0" bits in the bit pattern from the second pattern memory 27. The variance calculating unit 21 calculates the variance, or dispersion, of the weight data received from the aforesaid weight value memories via the multiplexer 20, and applies the variance to a comparator 22. A tolerance value setting memory 23 sets and stores a minimum allowable dispersion value, which is applied to the comparator 22. The latter compares the output of the variance calculating unit 21 with the value in the tolerance value setting memory 23 and applies the results of the comparison to the control unit 18.

Figure 2:
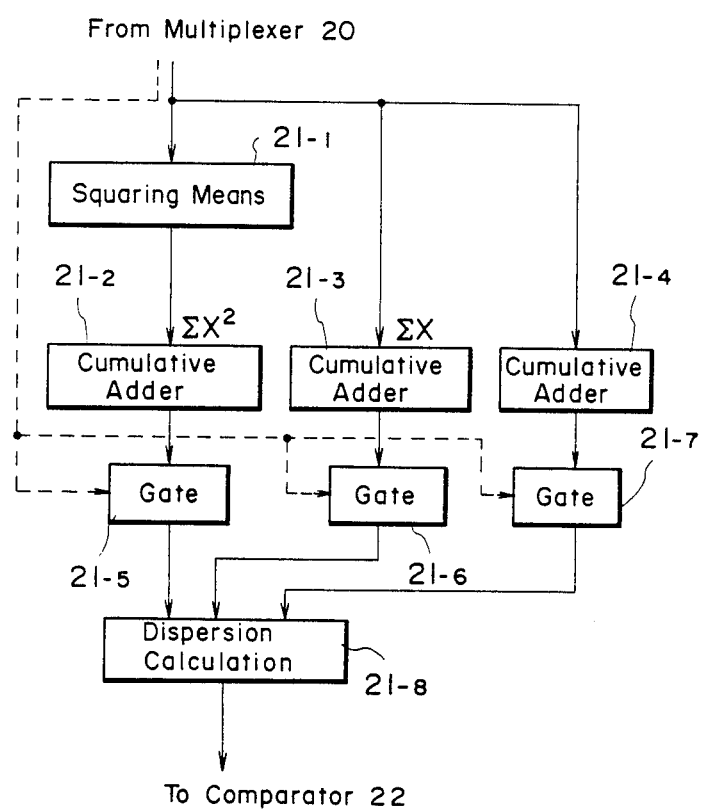
FIG. 2 is a block diagram of a variance calculating unit included in the apparatus of FIG. 1.

As shown in FIG. 2, the variance calculating unit 21 in the illustrated embodiment comprises squaring means 21-1 for squaring the weight data received from the multiplexer 20, a cumulative adder 21-2 for keeping a running total of the squared values received from the squaring means 21-1, a cumulative adder 21-3 for keeping a running total of the weight data received from the multiplexer 20, a cumulative adder 21-4 for counting the number of weight data items received from the multiplexer 20, gates 21-5, 21-6 and 21-7 receiving the outputs of the adders 21-2, 21-3 and 21-4, respectively, and dispersion calculation means 21-8 receiving the outputs of the adders through the gates for calculating a variance value.

In the operation of the present invention, the target weight value of the combinatorial process, and the upper and lower limit values of the allowable limits for a combined weight value, are applied to the target weight value setting memory 5, the upper limit value setting memory 6 and the lower limit value setting memory 7, respectively. The minimum allowable variance value is applied to the tolerance value setting memory 23. At the start of operation, the weight value memories 3-1 through 3-n, first and second error memories 14 and 15, and the first and second pattern memories 25 and 27 are cleared the output bit pattern of the combination generator 17 is all "0"s.

With the start of a combinatorial computation, the weights of articles supplied to the weighing hoppers of the weighing machines (not shown) are sensed by the weight sensors 1-1 through 1-n. The control unit 18 temporarily enables the gates 2-1 through 2-n so that the weight value outputs of the weight sensors 1-1 through 1-n may be applied to and stored in the respective weight value memories 3-1 through 3-n. The control unit 18 then enables the initialization gate 11 and instructs the combination generator 17 to produce the first combination pattern which, like all of the combination patterns, will consist of n bits. We will assume that only the first bit of the first combination pattern is logical "1", with all other bits in the pattern being logical "0".

The multiplexer 4, which receives the first combination pattern from the pattern generator 17, applies the weight data (weight value) in the weight value memory 3-1, corresponding to the "1" bit in the received combination pattern, to the adder/subtractor 8. The latter computes the difference between the target value set in the memory 5 and the sum of the weight values applied thereto, which in this case is solely the weight value from the weight value memory 3-1, and applies the result to the initialization gate 11. The adder/subtractor 8 also sends a signal to the control unit 18 to indicate that the addition and subtraction operation have been completed. The absolute value resulting from this initial operation is delivered for storage from the adder/subtractor 8 to the first and second error memories 14 and 15 via the initialization gate 11.

Next, the control unit 18 disables the initialization gate 11 and instructs the combination generator 17 to generate the second combination pattern. Assume that this is a bit pattern in which the second bit is "1" and all other bits are "0". The multiplexer 4 will respond by delivering the weight value in the weight value memory 3-2 to the adder/subtractor 8. As in the above-described case for the first combination, the adder/subtractor 8 proceeds to compute the difference between the contents of the set value setting memory 5 and the sum of the weight values (of which there is only one at the present time) from the multiplexer 4, and then sends a signal to the control unit 18 to indicate the end of the addition/subtraction operation.

In response to a signal from the control unit 18, the comparator 12 compares the absolute value of the arithmetic difference produced by the adder/subtractor 8, with the absolute value stored in the first error memory 14 by the previous operation. If the absolute value just produced by the adder/subtractor 8 is the smaller of the two, then the comparator 12 issues a command which is applied to the comparator 13. Upon receiving the command, the comparator 13 compares the absolute value from the adder/subtractor 8 with the value in the second error memory 15. If the former is smaller than the latter, the comparator 13 delivers a conversion signal to the gates 16 and 26. As a result, the value in the first error memory 14 is converted into the value held by the second error memory 15 through the gate 16, and the absolute value from the adder/subtractor 8 is stored in the second error memory 15, also via the gate 16. Further, through the gate 26, the bit pattern in the first pattern memory 25 is converted into the bit pattern stored in the second pattern memory 27, and the combination pattern currently being produced by the combination generator 17 is inserted in the second pattern memory 27. Conversely, if the comparator 13 finds that the absolute value from the adder/subtractor 8 is larger than the value in the second error memory 15, then the contents of the second error memory 15 and second pattern memory 27 are left unchanged, the value in the first memory 14 is converted into the absolute value from the adder/subtractor 8, and the bit pattern in the first pattern memory 25 is converted into the combination bit pattern from the combination generator 17.

Combination patterns are generated one after another in the foregoing fashion and the foregoing steps are performed in like manner for all $2^n-1$ combinations that will be produced. By doing so, the minimum error, relative to the target weight value, will be stored in the second error memory 15, and a combination pattern giving this minimum error will be stored in the second pattern memory 27. Further, the second smallest error relative to the target weight value will be stored in the first error memory 14, and the combination pattern prevailing at such time will be stored in the first pattern memory 25.

When the above-described comparison operations have been completed for the last combination pattern, namely the combination pattern all of whose n bits are logical "1", the control unit 18 instructs the gates 19 and 28 to deliver the bit pattern in the second pattern memory 27. As a result, the bit pattern in the second pattern memory 27 is applied to the drive control unit 29 and to the multiplexer 4, which then provides the adder/subtractor 8 with the weight values from those of the weight memories 3-1 through 3-n corresponding to the "1" bits in the combination pattern stored in the second pattern memory 27. The adder/subtractor 8 computes the difference between the value obtained from the target weight value setting memory 5 and the sum of the weight values received from the multiplexer 4, and applies the results to the upper limit comparator 9 and lower limit comparator 10. The upper limit comparator 9 compares the output of the adder/subtractor 8 with the upper limit value received from the memory 6 and, when the former is equal to or smaller than the latter, and delivers a signal indicative of the fact to the control unit 18. Likewise, when the output of the adder/subtractor 8 is equal to or greater than the lower limit value received from the memory 7, the lower limit comparator 10 sends a signal indicative of the fact to the control unit 18.

When the control unit 18 receives the foregoing signals from both the comparators 9 and 10, it enables the gate 24. When either or both of these signals fails to arrive, however, the control unit 18 sends an article discharge prohibit signal to the drive control unit 29, thereby prohibiting the weighing hoppers of the weighing machines from releasing their articles. When the gate 24 is enabled, the bit pattern stored in the second pattern memory 27 is applied to the multiplexer 20. The latter then successively provides the variance calculating unit 21 with the weight values from those weight value memories 3-1 through 3-n which correspond to the "0" bits in the combination pattern from the second pattern memory 27. That is, the variance calculating unit 21 is supplied with the weight values that were not summed by the adder/subtractor 8.

As shown in FIG. 2, each weight value from the multiplexer 20 is squared by the squaring means 21-1 of the variance calculating unit 21, with the cumulative adder 21-2 keeping a running total of the squared values by performing the operation $\Sigma x^2$, where $x^2$ is the result of each squaring operation. Each weight value from the multiplexer 20 is also added cumulatively by the cumulative adder 21-3, the latter performing the operation $\Sigma x$, where x represents each weight value, and the number of weight values is calculated by the cumulative adder 21-4, which produces an output N indicating the number of weight values calculated. When the multiplexer 20 has delivered all the necessary weight data to the variance calculating unit 21, the multiplexer 20 then proceeds to issue a signal enabling the gates 21-5, 21-6 and 21-7, whereby the outputs of the cumulative adders 21-2, 21-3 and 21-4 are applied to the variance calculating means 21-8. The latter responds by calculating a variance value V in accordance with the formula:

$$V = \frac{\Sigma x^2}{N} - \left(\frac{\Sigma x}{N}\right)^2$$

and by delivering V to the comparator 22. The latter compares the variance value V with the value set in the tolerance value setting memory 23 and applies a signal indicative of the result to the control unit 18. Specifically, when the variance value V from the calculating unit 21 is equal to or greater than the tolerance value from the setting memory 23, the signal from the comparator 22 causes the control unit 18 to send a signal to the drive control unit 29 indicating the completion of a combinatorial computation cycle. The drive control unit 29 responds in a manner described below.

When the variance value V from the calculating unit 21 is smaller than the tolerance value received from the setting memory 23, the comparator produces a signal to which the control unit 18 responds by opening the gates 19 and 28 with respect to the first pattern memory 25. As a result, the pattern stored in the first pattern memory 25, rather than in the second pattern memory 27, is applied to the drive control unit 29, and the upper and lower limits of the combined weight value based on the pattern stored in the first pattern memory 25 are investigated in the manner described above. When the error between this combined weight value and the target weight value falls outside the upper and lower limits set in the upper and lower limit setting memories 6 and 7, the control unit 18 sends a discharge prohibit signal to the drive control unit 29. If the error is within the upper and lower limits, then the control unit 18 provides the drive control unit 29 with a signal indicating the completion of the combinatorial computation cycle.

Whenever the control unit 18 applies a combinatorial completion signal to the drive control unit 29, the latter causes the combinatorial weighing apparatus to perform a series of operations with respect to those weighing machines corresponding to the "1" bits in the combination pattern received via the gate 28. The combination pattern is received from the first pattern memory 25 or second pattern memory 27, as described above. These operations include the steps of, e.g., opening the weighing hoppers corresponding to the weighing machines, closing these weighing hoppers upon passage of a predetermined length of time, supplying these weighing hoppers with articles by opening corresponding pool hoppers, closing these pool hoppers upon passage of a predetermined length of time, and supplying these pool hoppers with articles by driving a dispersing feeding apparatus.

When the drive control unit 29 receives the discharge prohibit signal, the weighing hoppers are left closed. This may then be followed by supplying some of the weighing machines with additional articles and then repeating the foregoing combinatorial computation and weighing cycle to obtain a combination of weighing machines that will give a total weight value within the preset allowable limits.

In the illustrated embodiment, the variance calculating unit 21 calculates the variance value exhibited by those weight values (weight data) which are not part of the combination pattern stored in the second pattern memory 27, that is, those weight values which were not added by the adder/subtractor 8 because they correspond to the "0"s in the combination pattern. The variance value is compared with the minimum allowable variance value set in the tolerance value setting memory 23. It should be noted, however, that the invention is not limited to this arrangement. More specifically, since the purpose of the variance value is to show the state of the statistical dispersion exhibited by the weight data which were not included in a weight combination, it is permissible to use any other value capable of expressing the state of the dispersion. For example, an alternative method would be to obtain the maximum and minimum values of the weight data items corresponding to the "0" bits in the combination pattern stored in the second pattern memory 27, compute the difference between these two values, and compare the difference with a preset tolerance value.

Further, in the illustrated embodiment, it was described that two combinations exhibiting combined weight values having the smallest deviation (error) from a target weight value are selected, the error values are stored in first and second error memories, and the combination patterns are stored in first and second pattern memories. However, the invention is not limited to this arrangement. For example, as an alternative arrangement, if a decline in operating speed is allowable, three or more combinations exhibiting combined weight values having the smallest deviation from a target weight value may be selected, these error values may be stored in three or more memories, and the combination patterns may be stored in three or more pattern memories, with processing being executed in a manner similar to that described hereinabove.

The illustrated embodiment is achieved by hardware using various electronic elements. However, it is obvious that the combinatorial weighing apparatus can be arranged to incorporate a microprocessor to achieve the foregoing results under the control of a program.

Thus, according to the combinatorial weighing method and apparatus of the present invention as described and illustrated hereinabove, there is obtained a combination of weighing machines giving a deviation from a target weight value that is within allowable limits, and an anticipatory operation is performed to determine whether a combined weight value obtained from the next weighing cycle will tend to be an unsatisafactory combined weight value, the arrangement being such as to select, wherever practical, a combination of weighing machines that will not provide an unsatisfactory combined weight value in the next weighing cycle. Such an arrangement results in far fewer unsatisfactory combined weight values in comparison with the prior-art method. By virtue of the present invention, therefore, the processing efficiency of the weighing apparatus can be improved, and there is less chance of the so-called "overscale" phenomenon described earlier.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method comprising the steps of:
   (a) supplying a plurality of weighing machines with articles to be weighed, each weighing machine producing a weight value corresponding to the weight of the articles weighed, and obtaining a plurality of acceptable combinations of said weighing machines, each acceptable weighing machine combination providing a combination of articles having a combined weight value equal or closest to a target weight value; and
   (b) discharging articles from a single optimum combination of said weighing machines from among the plurality of acceptable combinations of said weighing machines, said optimum combination being one which provides a combination of articles, the combined weight value of said optimum combination having a minimum error with respect to the target weight value, being within preset allowable limits, and having a statistical dispersion, determined by a variance value of the weight values from weighing machines which do not participate in the combination, having a value that is equal to or greater than a predetermined tolerance.

2. A combinatorial method according to claim 1, wherein said step (b) comprises the substep of determining the statistical dispersion of the weight values on the basis of maximum and minimum values of the weight values.

3. A combinatorial weighing apparatus in which a plurality of weighing machines are supplied with articles to be weighed, weight values from respective ones of the weighing machines are combined, a combination of the weighing machines is selected to give a combination of articles having a combined weight value within preset allowable limits and satisfying a predetermined condition, and the articles are discharged from the selected combination of weighing machines, said apparatus comprising:

means for obtaining a plurality of acceptable combinations of the weighing machines, each weighing machine combination providing a combination of articles having a combined weight value equal or closest to a target weight value;

means for producing a signal, in a case where the combination of articles, having the combined weight value has a minimum error with respect to the target weight value and is within preset allowable limits, to select a single optimum combination of weighing machines from among said plurality of acceptable combinations of weighing machines;

means for determining a statistical dispersion on the basis of a variance value exhibited by the weight values from the weighing machines which do not form the optimum combinations; and control means for discharging articles from the selected optimum combination of weighing machines when said signal is produced and when the statistical dispersion has a value that is equal to or greater than a predetermined tolerance.

4. A combinatorial weighing apparatus comprising:
hoppers holding batches of articles having corresponding weight values;

means for selecting a plurality of acceptable combinations of said hoppers batches of articles having a combined weight value within preset allowable limits of a target weight value;

means for producing a signal to select an optimum combination of said hoppers having a minimum error within the preset allowable limits with respect to the target value from among said plurality of acceptable combinations of said hoppers;

means for determining a statistical dispersion on the basis of a variance value exhibited by the weight values from the hoppers which do not participate in the optimum combination; and control means, coupled to said hoppers, for discharging batches of articles from the optimum combination of said hoppers when said signal is produced and the statistical dispersion is equal to or greater than a predetermined tolerance.

5. A combinatorial weighing apparatus according to claim 4, wherein when the statistical dispersion is less than the predetermined tolerance, said selecting means produces another signal which selects another optimum combination from among said acceptable combination of said hoppers.

6. A combinatorial weighing method comprising the steps of:
(a) supplying batches of articles to hoppers and measuring the weights of the batches of articles supplied to the hoppers;
(b) selecting a plurality of acceptable combinations of hoppers which combine to form a collection of articles having a combined weight value within preset limits of a target weight value;
(c) calculating a dispersion in accordance with a variance value of the weight values from the hoppers which are not selected;
(d) generating a signal to select an optimum combination of the hoppers having a minimum error within the preset limits of the target weight value from among the plurality of acceptable combinations of the hoppers; and
(e) discharging the batches of articles from the optimum combination of hoppers when the signal is produced and the dispersion has a value equal to or greater than a predetermined tolerance.

7. A combinatorial weighing method according to claim 6, further comprising the substep of repeating said steps (c) through (e) when the dispersion value is less than the predetermined tolerance.

* * * * *

UNITED STATES PATENT AND TRADEMARK OFFICE
CERTIFICATE OF CORRECTION

PATENT NO. : 4,549,618
DATED : OCTOBER 29, 1985
INVENTOR(S) : KATSUAKI KONO

It is certified that error appears in the above-identified patent and that said Letters Patent is hereby corrected as shown below:

```
FRONT PAGE [56] References Cited,
          "4,385,671 5/1983 Hirano" should be
          --4,385,671 5/1983 Hirano I--;

"4,416,341 11/1983 Hirano" should be
          --4,416,341 11/1983 Hirano II--.

Col. 2, line 8, "whereof has" should be --having--;
        line 68, "3-1, 3n" should be --3-1-3-n--.

Col. 3, line 22, "from," should be --from--;
        line 24, "comparision" should be --comparison--.

Col. 10, line 2, after "hoppers" insert --holding--.
```

Signed and Sealed this

Twenty-eighth Day of January 1986

[SEAL]

Attest:

DONALD J. QUIGG

Attesting Officer

Commissioner of Patents and Trademarks